(12) United States Patent
Hsu et al.

(10) Patent No.: US 8,379,220 B2
(45) Date of Patent: Feb. 19, 2013

(54) IMAGING AND MEASURING APPARATUS FOR SURFACE AND INTERNAL INTERFACE OF OBJECT

(75) Inventors: I-Jen Hsu, Chung Li (TW); Chun-Wei Chang, Chung-Li (TW)

(73) Assignee: Chung Yuan Christian University, Chung Li (TW)

( * ) Notice: Subject to any disclaimer, the term of this patent is extended or adjusted under 35 U.S.C. 154(b) by 233 days.

(21) Appl. No.: 12/778,363

(22) Filed: May 12, 2010

(65) Prior Publication Data

US 2011/0181890 A1 Jul. 28, 2011

(30) Foreign Application Priority Data

Jan. 27, 2010 (TW) .............................. 99102224 A

(51) Int. Cl.
*G01B 11/02* (2006.01)
(52) U.S. Cl. ...................................................... 356/497
(58) Field of Classification Search .................. 356/479, 356/497, 511
See application file for complete search history.

(56) References Cited

U.S. PATENT DOCUMENTS

| | | | | | |
|---|---|---|---|---|---|
| 5,301,010 | A | * | 4/1994 | Jones et al. | 356/479 |
| 5,519,491 | A | * | 5/1996 | Gaechter et al. | 356/486 |
| 5,973,781 | A | * | 10/1999 | Moeller et al. | 356/495 |
| 6,545,761 | B1 | * | 4/2003 | Aziz et al. | 356/497 |
| 7,649,630 | B2 | * | 1/2010 | Hogan | 356/497 |
| 2001/0000978 | A1 | * | 5/2001 | Hitzenberger et al. | 356/484 |
| 2001/0043332 | A1 | * | 11/2001 | Toida | 356/479 |
| 2005/0219544 | A1 | * | 10/2005 | Chan et al. | 356/497 |

OTHER PUBLICATIONS

Chun-Wei Chang and I-Jen Hsu; High-Resolution Measurement of Internal Interface of Optically Transparent Materials; Proc. SPIE/vol. 7426/Multiple Surfaces and Freeform Optics; Online Publication Date: Aug. 21, 2009.

* cited by examiner

*Primary Examiner* — Tarifur Chowdhury
*Assistant Examiner* — Jonathon Cook
(74) *Attorney, Agent, or Firm* — Rosenberg, Klein & Lee

(57) ABSTRACT

The present invention provides an imaging and measuring apparatus for the surface and the internal interface of an object, which comprises a broadband wave source, a wave-splitting structure, a wave-delaying device, a reflecting component, and a sensor. The broadband wave source transmits a broadband incident wave. The wave-splitting structure splits the broadband incident wave into a first incident beam, a second incident beam, and a third incident beam. The first incident beam is illuminated on an object under test, which reflects a measuring beam. The wave-delaying device receives the second incident beam and reflects a reference beam. The reflecting component receives the third incident beam and reflects a calibration beam. The sensor receives a first interference signal of the measuring beam and the reference beam, and a second interference signal of the reference beam and the calibration beam. By means of the broadband incident wave, the morphologies of the surface and the internal interface of the object can be imaged and measured in a non-destructive way. In addition, by means of the calibration beam, the accuracy of imaging and measuring the surface and the internal interface of the object can be improved.

10 Claims, 11 Drawing Sheets

IMAGING AND MEASURING APPARATUS FOR SURFACE AND INTERNAL INTERFACE OF OBJECT

FIELD OF THE INVENTION

The present invention relates generally to an imaging and measuring apparatus for an object, and particularly to an imaging and measuring apparatus for the surface and the internal interface of an object.

BACKGROUND OF THE INVENTION

With the progress of modern technologies, the imaging and measuring technologies for the surface of an object are well developing increasingly. In particular, the variations and fine grain of the surface of an object can be measured by atomic force microscopes, electron microscopes, and optical technologies. Hence, the imaging and measuring technologies for the surface of an object has become common technologies. However, for achieving high-accuracy measurement, costly equipment, which is difficult to measure rapidly, is generally needed. In addition, it lacks a high-accuracy measuring apparatus for the internal interface of an object currently. For measuring the internal interface of an object, it is usually necessary to destroy the completeness of an object.

Nevertheless, the internal interface of some objects is unable or not suitable to be measured by the destructive method. For example, the biological tissues or cells usually need to be measured under the condition of not destroying their completeness. Alternatively, the morphology of the internal interface of many industrial materials, archaeological relics, and works of art can only be measured without being destroyed. However, current technologies capable of measuring the internal interface of an object without destroying the completeness of the object, such as ultrasonic imaging and optical coherence tomography, cannot achieve nanometer-scale accuracy.

Accordingly, the present invention provides an imaging and measuring apparatus for the surface and the internal interface of an object, which can image and measure the surface and the internal interface of a solid or liquid object with high accuracy without destroying the object. Thereby, the problems described above can be solved.

SUMMARY

An objective of the present invention is to provide an imaging and measuring apparatus for the surface and the internal interface of an object, which uses a broadband wave source to generate a broadband incident wave. By means of the broadband incident wave, the morphologies of the surface and the internal interface of an object can be imaged and measured in a non-destructive way, and hence enhancing convenience on imaging the surface and the internal interface of the object.

Another objective of the present invention is to provide an imaging and measuring apparatus for the surface and the internal interface of an object, which uses a reflecting component for receiving an incident beam and reflecting a calibration beam. By means of the calibration beam, the accuracy of imaging and measuring the surface and the internal interface of the object can be improved. Besides, the speed of imaging and measuring the surface and the internal interface of the object can be increased as well.

The imaging and measuring apparatus for the surface and the internal interface of an object according to the present invention comprises a broadband wave source, a wave-splitting structure, a wave-delaying device, a reflecting component, and a sensor. The broadband wave source transmits a broadband incident wave. The wave-splitting structure splits the broadband incident wave into a first incident beam, a second incident beam, and a third incident beam. The first incident beam impinges on an object under test, which reflects a measuring beam. The wave-delaying device receives the second incident beam and reflects a reference beam. The reflecting component receives the third incident beam and reflects a calibration beam. The sensor receives a first interference signal of the measuring beam and the reference beam. The first interference signal is the signal representing the morphologies of the surface and the internal interface of the object. The sensor also receives a second interference signal of the reference beam and the calibration beam. The second interference signal is used for compensating phase deviation. By means of the broadband incident wave, the morphologies of the surface and the internal interface of the object can be imaged and measured in a non-destructive way. In addition, by means of the calibration beam, the accuracy of imaging and measuring the surface and the internal interface of the object can be improved.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
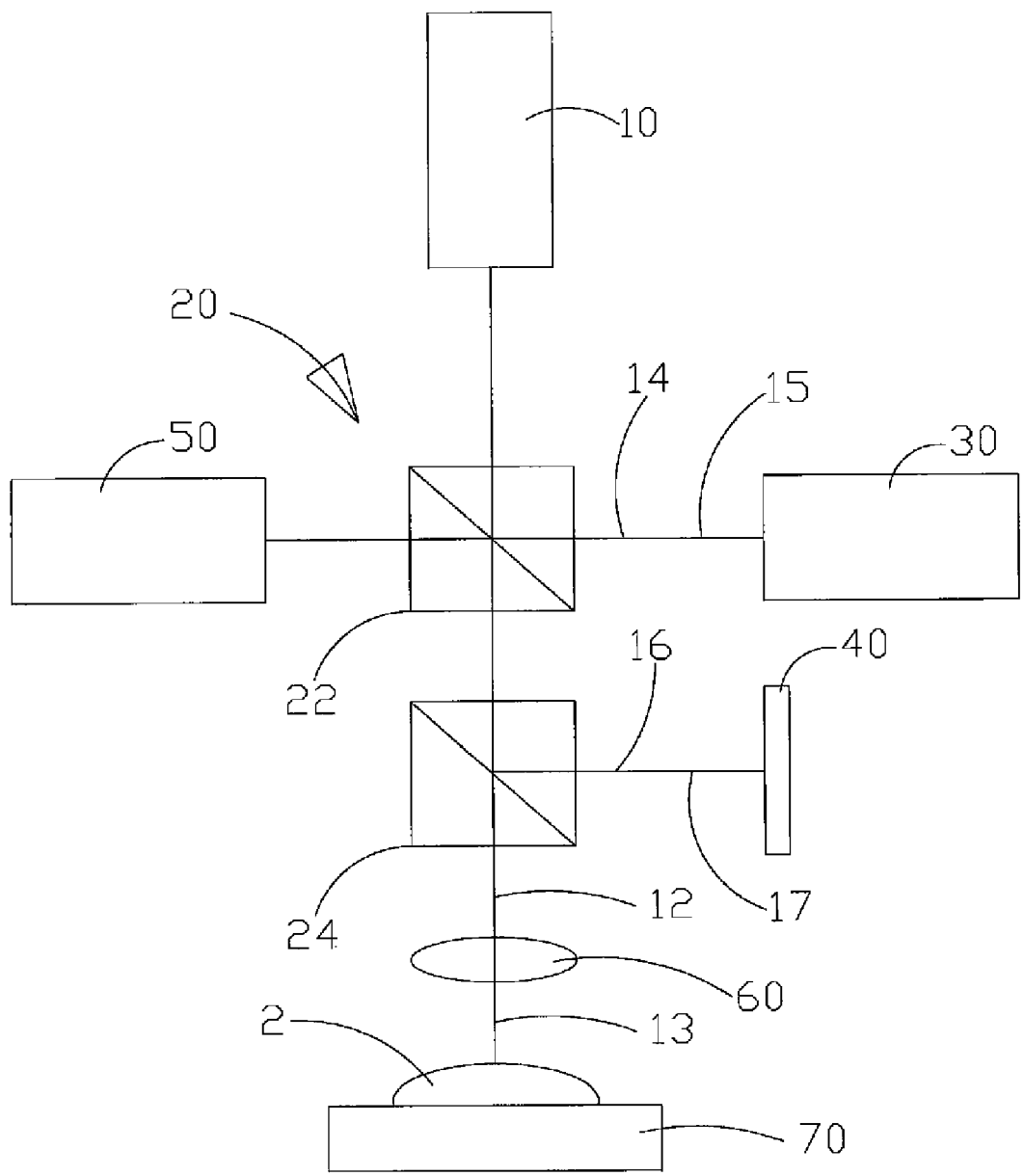
FIG. 1 shows a structural schematic diagram of an imaging and measuring apparatus for the surface and the internal interface of an object according to a preferred embodiment of the present invention.

FIG. 1 shows a structural schematic diagram of an imaging and measuring apparatus for the surface and the internal interface of an object according to a preferred embodiment of the present invention. As shown in the figure, the imaging and measuring apparatus for the surface and the internal interface of an object according to the present invention comprises a broadband wave source 10, a wave-splitting structure 20, a wave-delaying device 30, a reflecting component 40, and a sensor 50. The broadband wave source 10 emits a broadband incident wave. The wave-splitting structure 20 splits the broadband incident wave into a first incident beam 12, a second incident beam 14, and a third incident beam 16. The first incident beam 12 is incident on an object under test 2, which reflects a measuring beam 13. The wave-delaying device 30 receives the second incident beam 14 and reflects a reference beam 15. The reflecting component 40 receives the third incident beam 16 and reflects a calibration beam 17. The sensor 50 receives a first interference signal of the measuring beam 13 and the reference beam 15, and a second interference signal of the reference beam 15 and the calibration beam 16. The first interference signal is the signal representing the imaging of the surface or internal interface of the object.

According to the present embodiment, a broadband light source is used as an example of the broadband wave source 10. However, in practical applications, the broadband wave source 10 of the system is not limited to light. The wave-splitting structure 20 includes a first beamsplitter 22 and a second beamsplitter 24. The first beamsplitter 22 splits the second incident beam from the broadband incident wave. The second incident beam 14 is then transmitted to the wave-delaying device 30. The second beamsplitter 24 receives the remaining beam of the broadband incident wave, and splits it into the first incident beam 12 and the third incident beam 16. The first incident beam 12 is transmitted to the object under test 2; the third incident beam 16 is transmitted to the reflecting component 40. The function of the first and the second beamsplitters 22, 24 is to make the incident light partially transmitted and partially reflected at right angle.

The function of the wave-delaying device 30 is to make the length of the path by which the incident light passes before reflecting back to the first beamsplitter 22 change with time, or equivalent phase delay or phase shift. The sensor 50 is a photodetector for detecting light signals. The reflecting component 40 is a reflection mirror, used for reflecting the normally incident light. The interference signal of the calibration beam 17 reflected by the reflecting component 40 and the reference beam 15 is received by the sensor 50 for correcting the phase errors of the first interference signal.

The present invention further comprises a lens 60 and a translation device 70. The lens 60 is disposed between the object under test 2 and the wave-splitting structure 20. The translation device 70 is disposed under the object under test 2. The lens 60 is used for focusing the light beam entering the object, reducing the diameter of the light beam, and hence increasing lateral resolution. The translation device 70 is a carrier, used for moving the object under test 2 for lateral scanning.

The light signal in the sample arm that comes from the broadband wave source 10, passes the surface or the internal interface of the object under test 2, and reaches the sensor 50 (that is, following the path of the broadband wave source 10—the first beamsplitter 22—the second beamsplitter 24—the lens 60—the object under test 2—the lens 60—the second beamsplitter 24—the first beamsplitter 22—the sensor 50) is expressed by the electric field:

$$E_S(t) = \int S_S(\omega) \exp(i\omega t) d\omega$$

where $\omega$ is the angular frequency of the light; $S_S(\omega)$ is the spectral function of the reflected beam. On the other hand, the light signal in the reference arm that comes from the light source and is reflected by the wave-delaying device 30, and reaches the sensor 50 (that is, following the path of the broadband wave source 10—the first beamsplitter 22—the wave-delaying device 30—the first beamsplitter 22—the sensor 50) is expressed by the electric field:

$$E_R(t) = \int S_R(\omega) \exp[i\omega(t-\tau)] d\omega$$

where $S_R(\omega)$ is the spectral function of the reflected beam. The time delay $\tau$ is related to the optical path lengths $l_S$ and $l_R$ in the sample and reference arms:

$$\tau = \frac{2(l_R - l_S)}{c}$$

where c is the speed of light. Then, the sensor 50 will detect the interference signal of the two light signals:

$$I(\tau) \propto \langle |E_S(t) + E_R(t)|^2 \rangle = \langle |E_S(t)|^2 \rangle + \langle |E_R(t)|^2 \rangle + \langle 2 Re E_S(t) E^*_R(t) \rangle$$

where $\langle \ \rangle$ represents averaging over time. The cross-correlation function is proportional to the third term in the interference signal:

$$\Gamma(\tau) = \Gamma_0(\tau) \cos(\omega_0 \tau)$$

where $\Gamma_0(\tau)$ corresponds to the interference envelope, which is related to the spectral function of light source.

The light signal that comes from the light source and is reflected by the reflecting component 40, and reaches the sensor 50 (namely, following the path of the broadband wave source 10—the first beamsplitter 22—the second beamsplitter 24—the reflecting component 40—the second beamsplitter 24—the first beamsplitter 22—the sensor 50) is:

$$E'_S(t) = \int S'_S(\omega) \exp(i\omega t) d\omega$$

where $S'_S(\omega)$ is the spectral function of the reflected beam. This beam interferes with the light signal in the reference arm that comes from the light source and is reflected by the wave-delaying device 30, and reaches the sensor 50 (that is, following the path of the broadband wave source 10—the first beamsplitter 22—the wave-delaying device 30—the first beamsplitter 22—the sensor 50) and is expressed by:

$$E_R(t) = \int S_R(\omega) \exp[i\omega(t-\tau')] d\omega$$

The time delay $\tau'$ is related to the optical paths lengths $l'_S$ and $l_R$:

$$\tau' = \frac{2(l_R - l'_S)}{c}$$

In addition, the cross-correlation function is $$\Gamma'(\tau')=\Gamma'_0(\tau')\cos(\omega_0\tau')$$

The phase of the cross-correlation function $\Gamma_0(\tau)$ is $$\phi=\omega_0\tau$$

On the other hand, the phase of the cross-correlation function $\Gamma'(\tau')$ is $$\phi'=\omega_0\tau'$$

Hence the phase difference is $$\Delta\phi = \omega_0(\tau' - \tau)$$
$$= \frac{2\omega_0}{c}(l_S - l'_S)$$

Because $l'_S$ is fixed, by the two-dimensional distribution of $\Delta\phi$, the two dimensional distribution of $l_S$, which is the morphology of the surface or the internal interface of the sample, will be given.

According to the present invention, by means of the broadband incident wave, the morphologies of the surface and the internal interface of the object can be imaged and measured in a non-destructive way. In addition, by means of the calibration beam, the accuracy of imaging and measuring the surface and the internal interface of the object can be improved.

The present invention can be applied to objects made of various materials only if the adopted wave source can be transmitted to the interface under test inside the materials. The present invention can be applied to solid or liquid materials. It is non-destructive to the object under test 2. Besides, different wave sources, for example, electromagnetic wave (light) sources, acoustic wave sources, ultrasonic wave sources, and terahertz wave sources with different wavelengths and intensities can be chosen according to different objects under test 2.

The system architecture of the present invention owns great flexibility. According to the similar concept, the system can be adapted for different applications or objects under test 2, or even can be implemented using optical fibers or other waveguides. In addition to imaging and measuring the surface and the internal interface of an object, the present invention can combine with other optical techniques and algorithms for giving the spectral properties and optical rotation (birefringence) property of a specific layer inside the object.

The present invention is insensitive to the disturbance of environment, simple, easy to operate, and low-cost. It can cooperate with a rapid scanning mechanism for rapid imaging and measuring. Besides, it also can define clearly the accuracy of the system. In addition to fundamental science including physics, chemistry, and biology, the application fields of the present invention also include industry, medicine, agriculture, art, and archeology.

Figure 2:
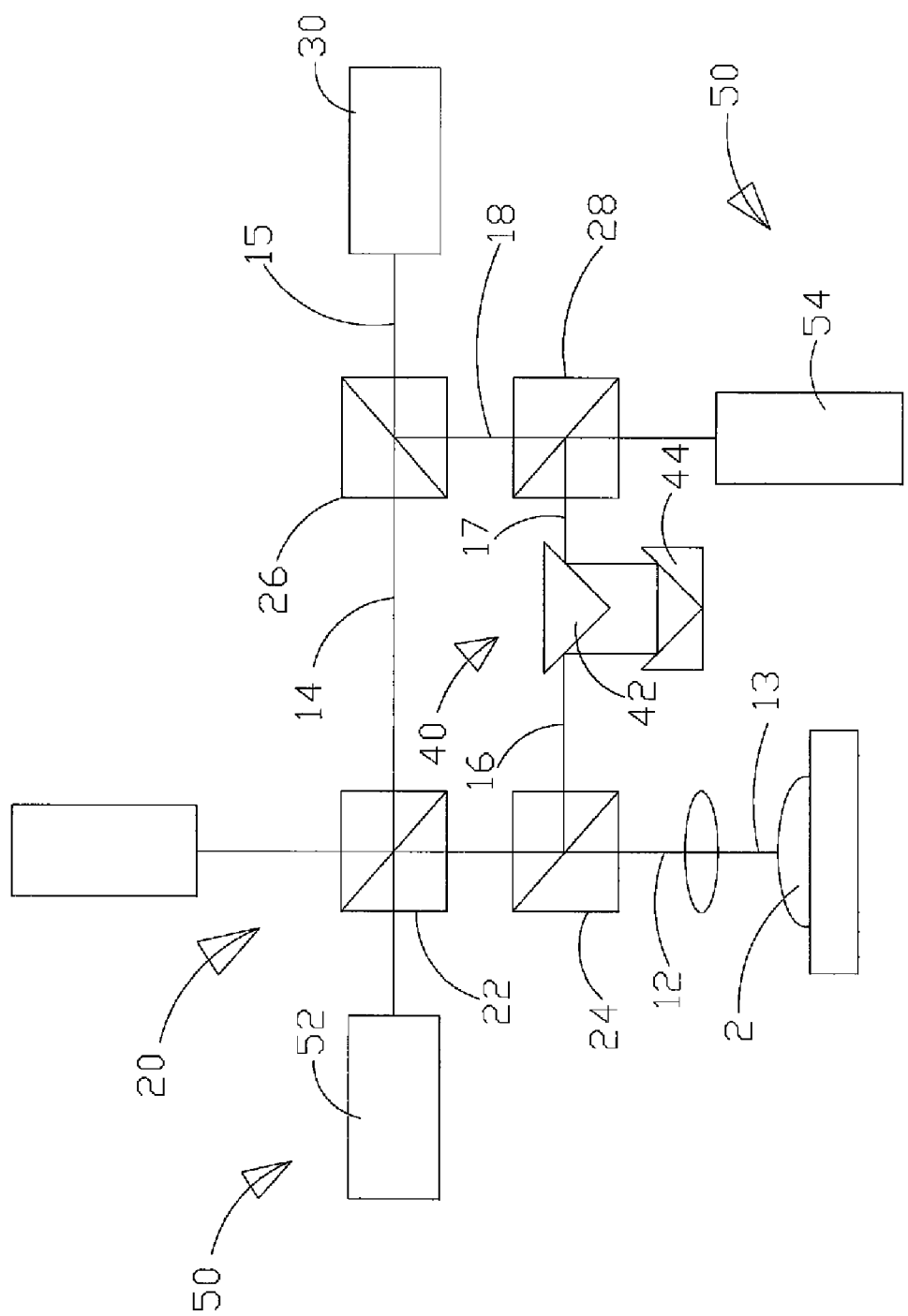
FIG. 2 shows a structural schematic diagram of an imaging and measuring apparatus for the surface and the internal interface of an object according to another preferred embodiment of the present invention.

FIG. 2 shows a structural schematic diagram of an imaging and measuring apparatus for the surface and the internal interface of an object according to another preferred embodiment of the present invention. As shown in the figure, the difference between the present embodiment and the previous one is that the sensor 50 according to the present embodiment further comprises a first sensor 52 and a second sensor 54. The first sensor 52 receives a first interference signal of the measuring beam 13 and the reference beam 15; the second sensor 54 receives a second interference signal of the reference beam 15 and the calibration beam 17. The first interference signal is the graphic signal of the surface or the internal interface of an object; the second interference signal is the interference signal for calibrating phase deviations. By adjusting the location of a second wave-delay component 44, the location of the second interference signal and the location of the interference signal representing the interface under test in the first interference signal coincide. Thereby, direct subtraction between the phases of the two interference signals can be performed by hardware or software schemes for improving imaging and measuring convenience and speed.

In order to guide the calibration beam 17 and the reference beam 15, respectively, and make them be received by the second sensor 54, the wave-splitting structure 20 according to the present embodiment comprises a first beamsplitter 22, a second beamsplitter 24, a third beamsplitter 26, and a fourth beamsplitter 28. The first beamsplitter 22 splits the broadband incident wave; the second beamsplitter 24 receives the light split by the first beamsplitter 22 and splits it into the first incident beam 12 and the third incident beam 16. The first incident beam 12 is transmitted to the object under test 2; the third incident beam 16 is transmitted to the reflecting component 40. The third beamsplitter 26 is disposed between the first beamsplitter 22 and the wave-delaying device 30. The second incident beam 14 passes through the third beamsplitter 26 and is transmitted to the wave-delaying device 30. The fourth beamsplitter 28 is disposed between the third beamsplitter 26 and the second sensor 54. It receives the reference beam 18 firstly reflected by the wave-delaying device 30 and then reflected by the third beamsplitter 26, and transmits the reference beam 18 to the second sensor 54. The reflecting component 40 receives the third incident beam 16 and reflects the calibration beam 17. The fourth beamsplitter 28 receives the calibration beam 17 and reflects it to the second sensor 54.

The reflecting component 40 according to the present embodiment includes a first reflection mirror 42 and the second reflection mirror 44. The first reflection mirror 42 reflects the third incident beam 16; the second reflection mirror 44 receives and reflects the reflected third incident beam 16. The first reflection mirror 42 then receives the reflected third incident beam 16, and reflects the calibration beam 17 to the fourth beamsplitter 28.

Figure 3:
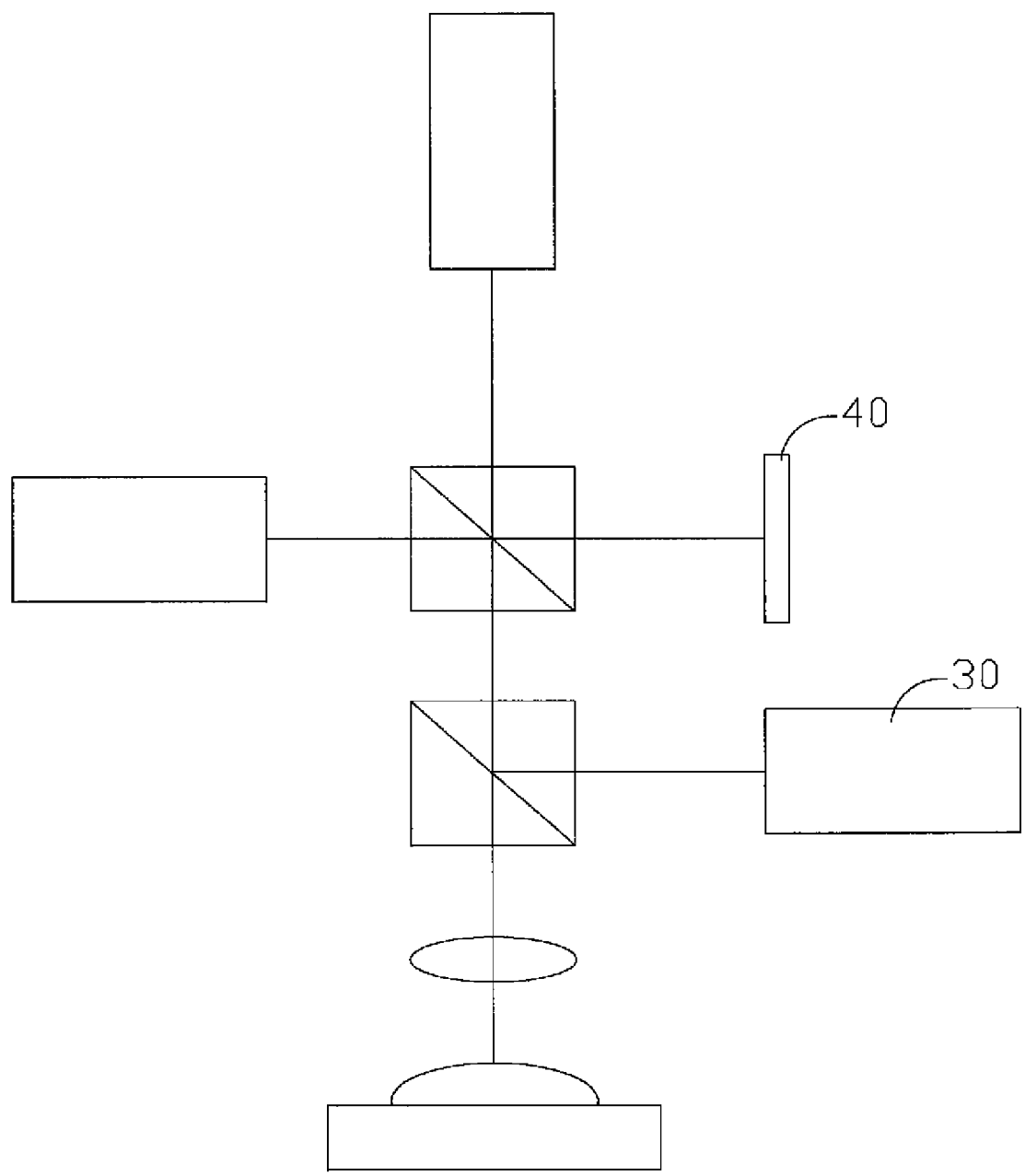
FIG. 3 shows a structural schematic diagram of an imaging and measuring apparatus for the surface and the internal interface of an object according to another preferred embodiment of the present invention.

FIG. 3 shows a structural schematic diagram of an imaging and measuring apparatus for the surface and the internal interface of an object according to another preferred embodiment of the present invention. As shown in the figure, the difference between the present embodiment and the one in FIG. 1 is that the locations of the wave-delaying device 30 and the reflecting component 40 according to the present embodiment are different. According to the present embodiment, the locations of the wave-delaying device 30 and the reflecting component 40 can be exchanged depending on practical requirements, which will not influence the measuring result.

Figure 4A:
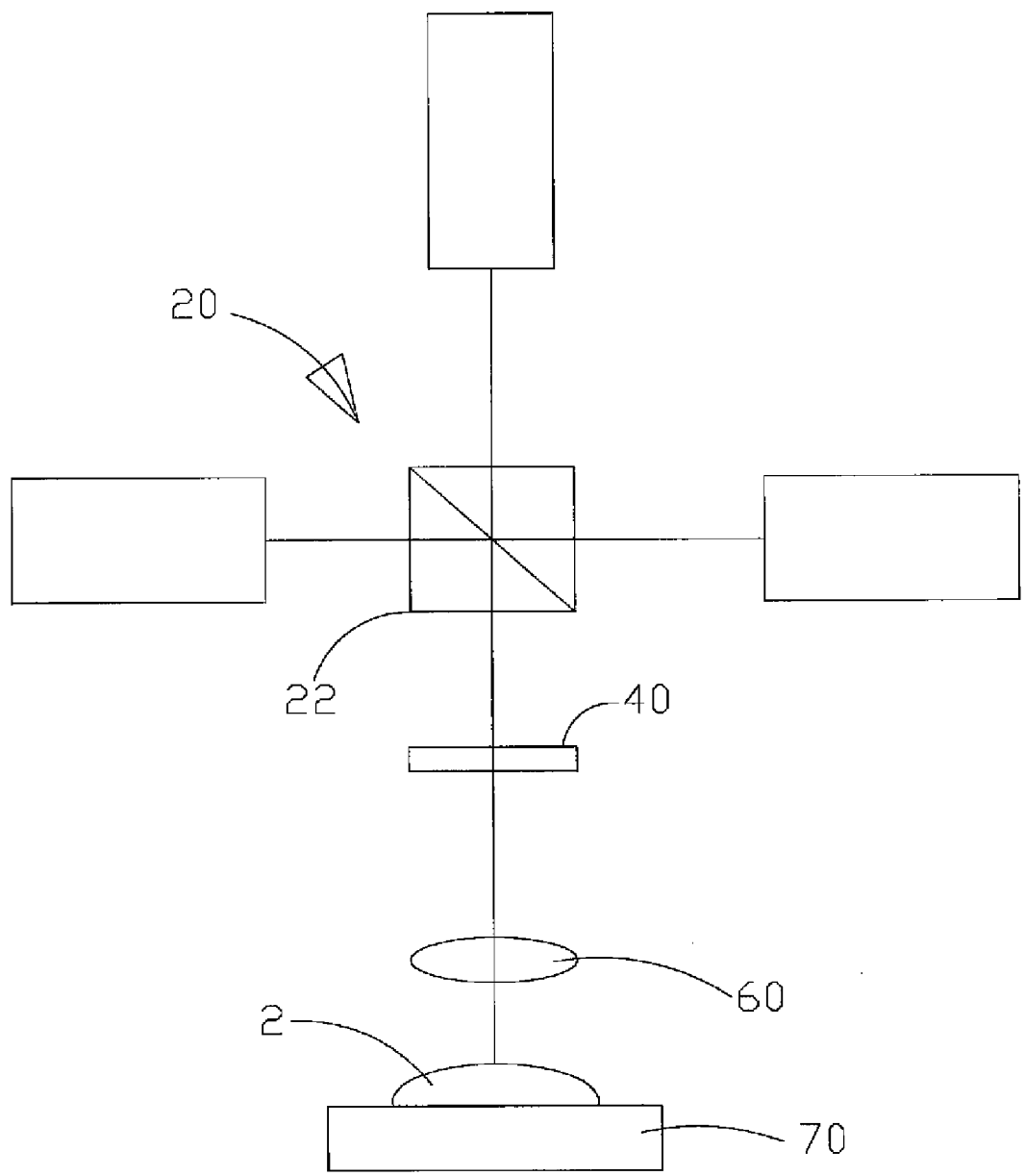
FIG. 4A shows a structural schematic diagram of an imaging and measuring apparatus for the surface and the internal interface of an object according to another preferred embodiment of the present invention.
Figure 4B:
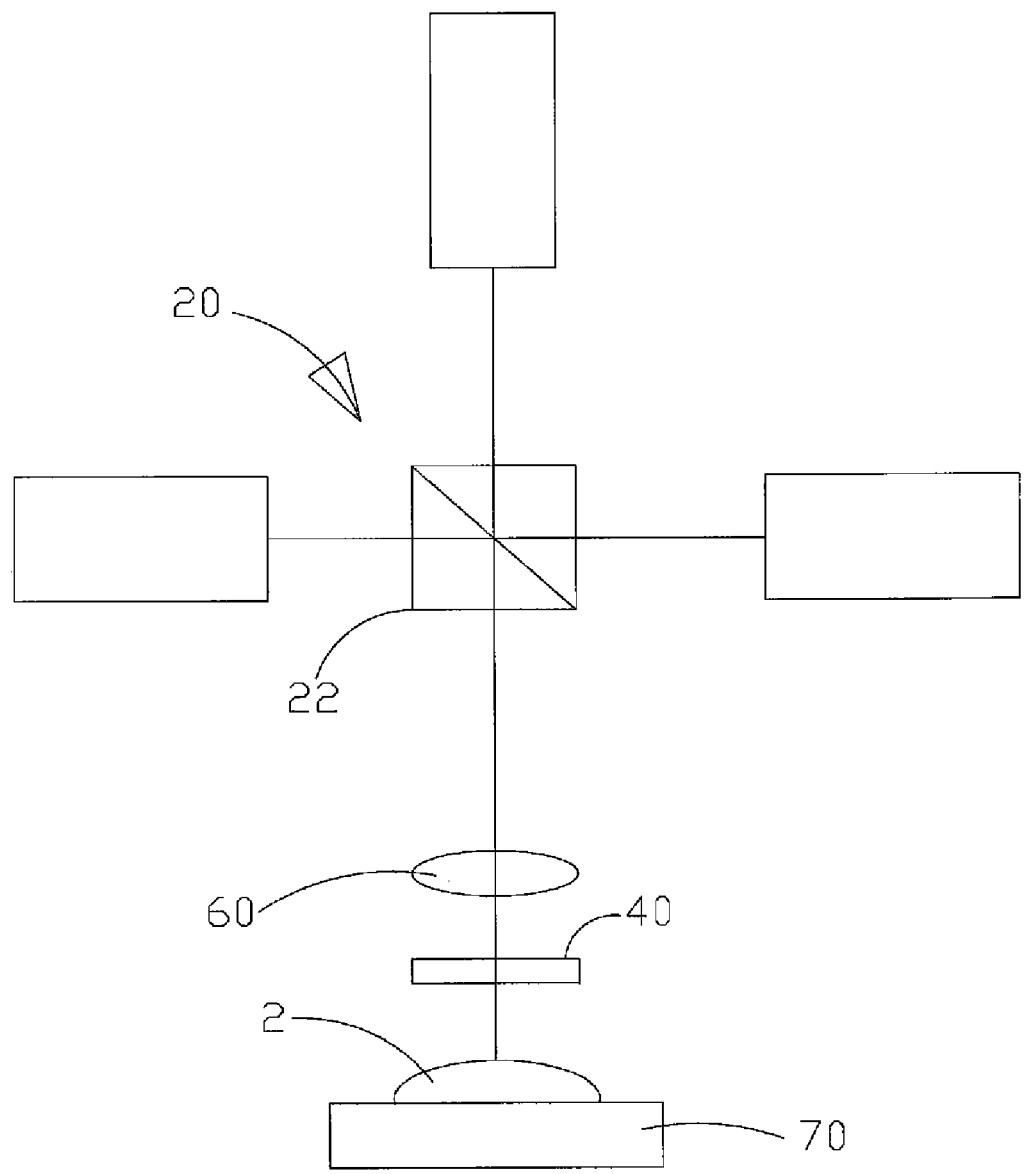
FIG. 4B shows a structural schematic diagram of an imaging and measuring apparatus for the surface and the internal interface of an object according to another preferred embodiment of the present invention.
Figure 4C:
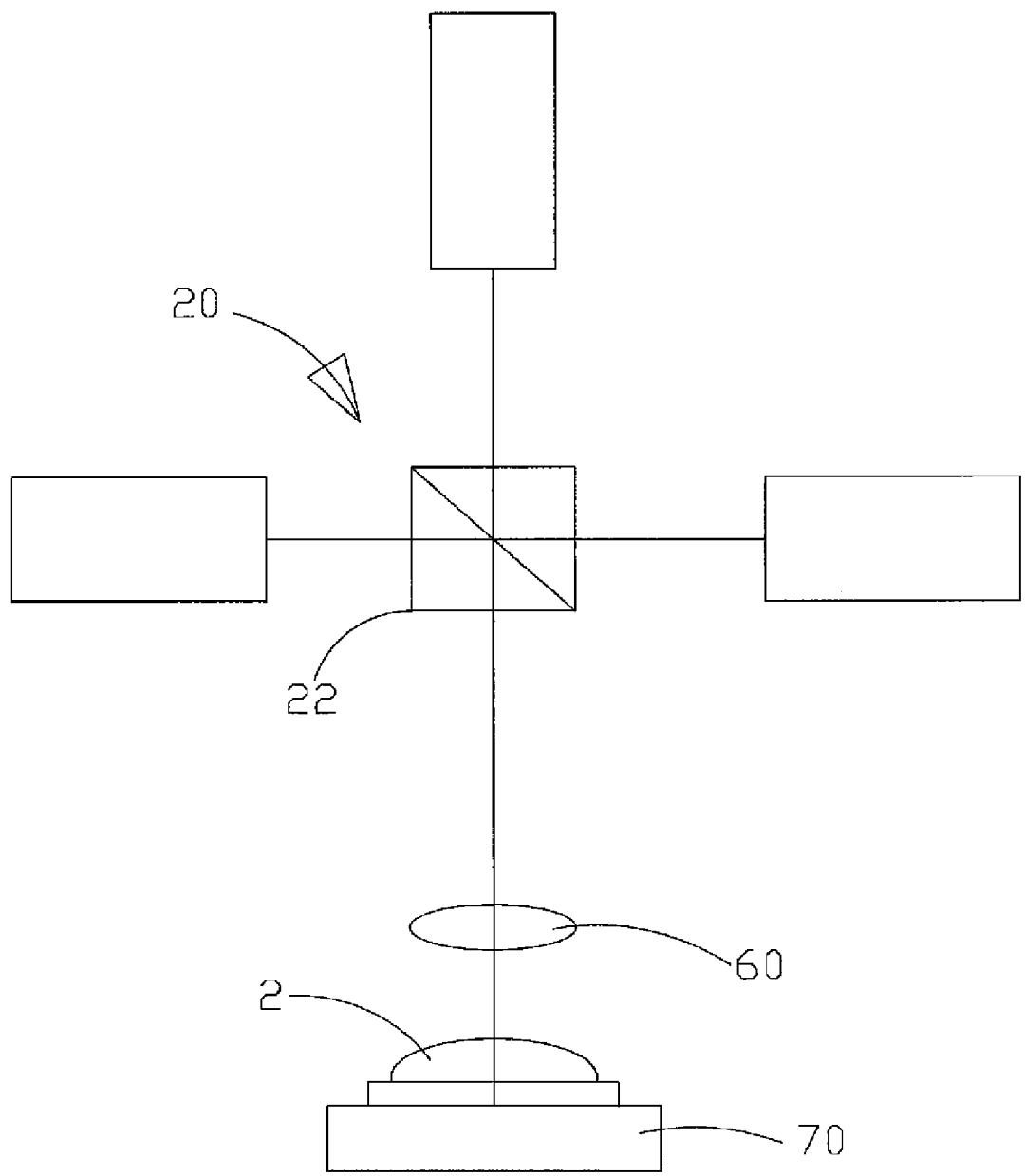
FIG. 4C shows a structural schematic diagram of an imaging and measuring apparatus for the surface and the internal interface of an object according to another preferred embodiment of the present invention.

FIGS. 4A to 4C show structural schematic diagrams of an imaging and measuring apparatus for the surface and the internal interface of an object according to various embodiments of the present invention. As shown in the figure, the difference between the present embodiments and the one in FIG. 1 is that the wave-splitting structure 20 according to the present embodiments includes the first beamsplitter 22 only, and the reflecting component 40 can be disposed in front of the lens 60, as shown in FIG. 4A. Alternatively, the reflecting component 40 can be disposed between the lens 60 and the object under test 2, as shown in FIG. 4B. Alternatively, the reflecting component 40 can be disposed between the object under test 2 and the translation device 70, as shown in FIG. 4C.

Figure 5:
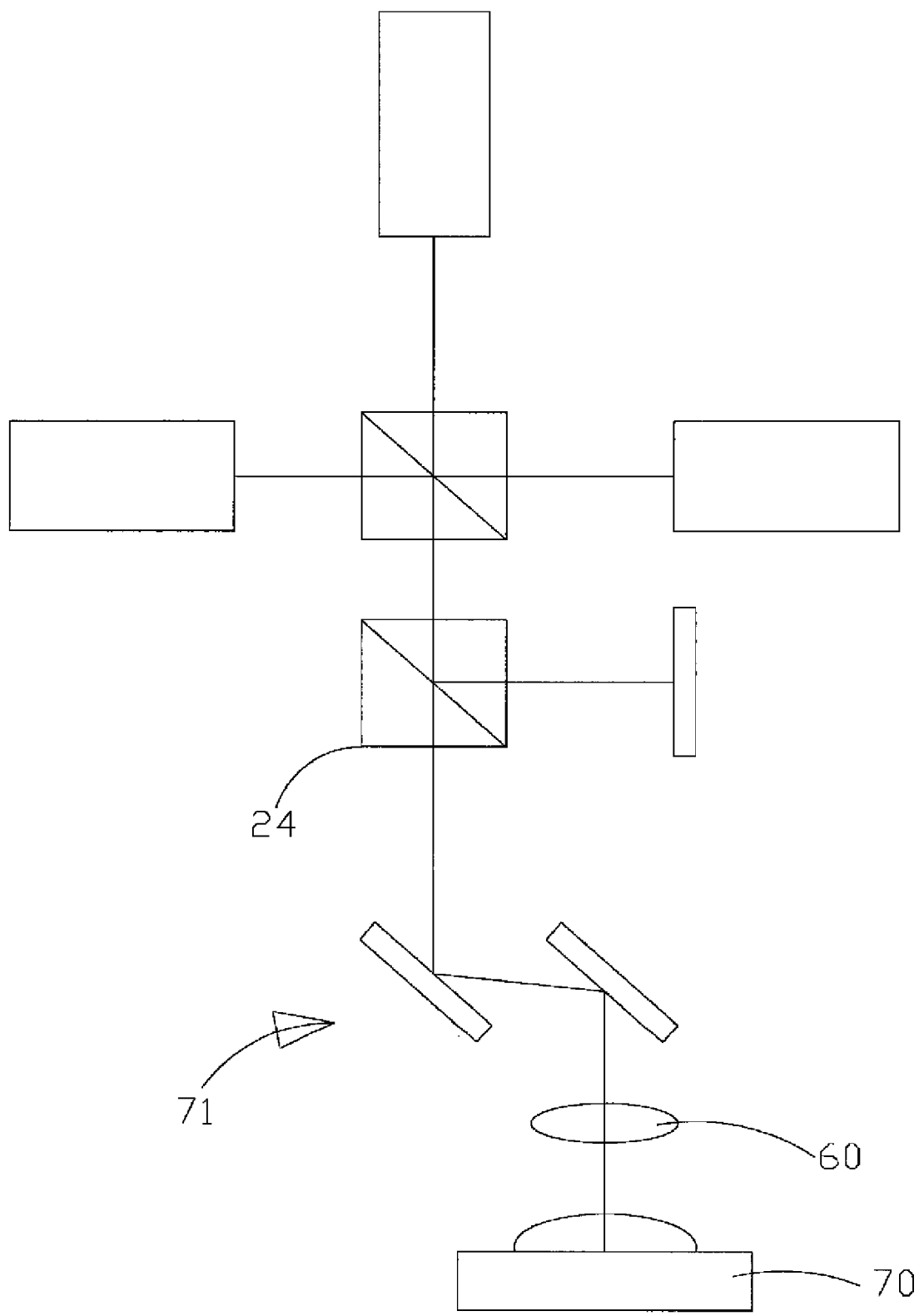
FIG. 5 shows a structural schematic diagram of an imaging and measuring apparatus for the surface and the internal interface of an object according to another preferred embodiment of the present invention.

FIG. 5 shows a structural schematic diagram of an imaging and measuring apparatus for the surface and the internal interface of an object according to another preferred embodiment of the present invention. As shown in the figure, the difference between the present embodiment and the one in FIG. 1 is that the present embodiment further comprises a rotationally scanning device 71 disposed between the second beamsplitter 24 and the lens 60. By using the rotationally scanning device 71, the imaging and measuring convenience can be enhanced.

Figure 6A:
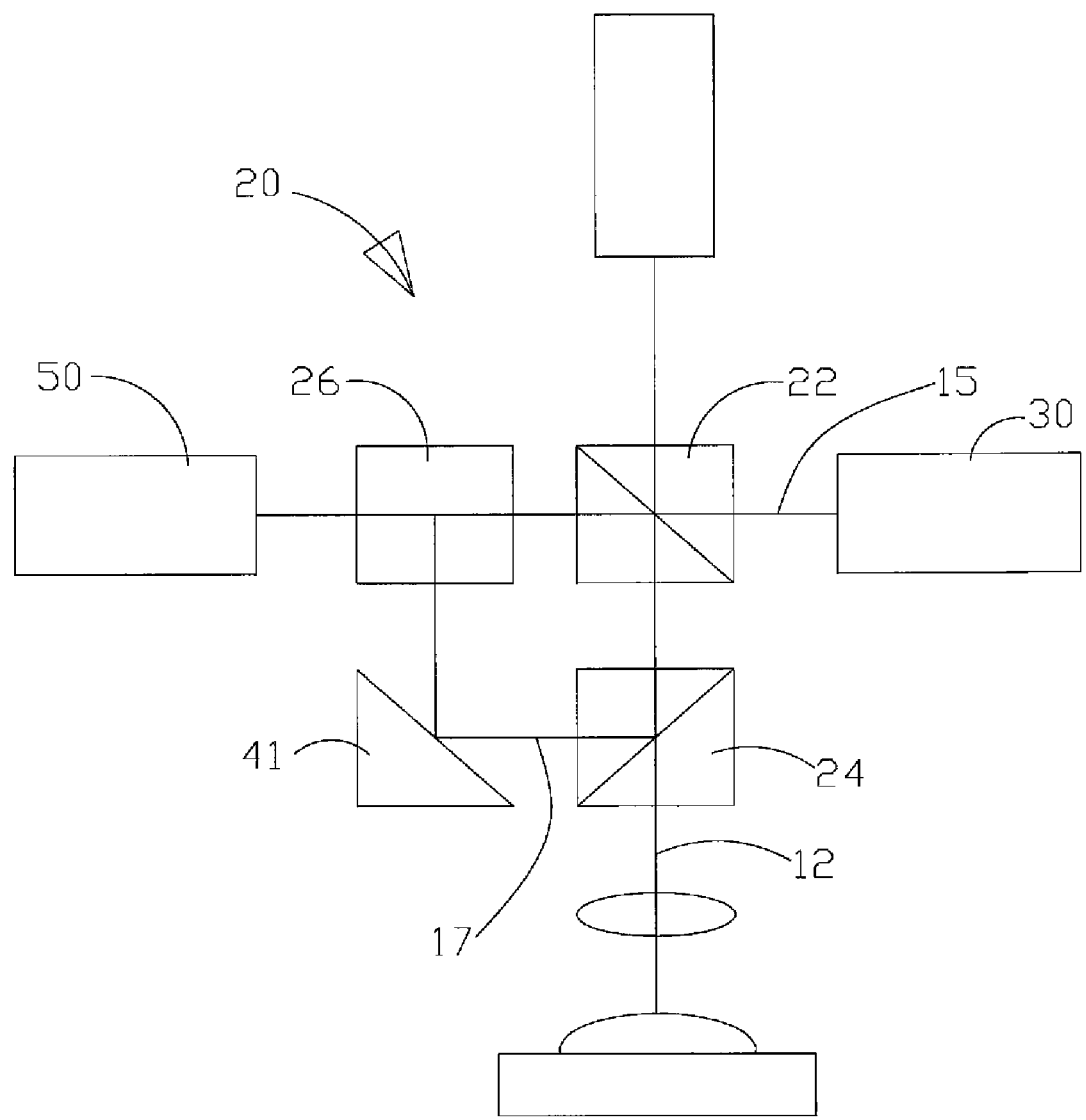
FIG. 6A shows a structural schematic diagram of an imaging and measuring apparatus for the surface and the internal interface of an object according to another preferred embodiment of the present invention.
Figure 6B:
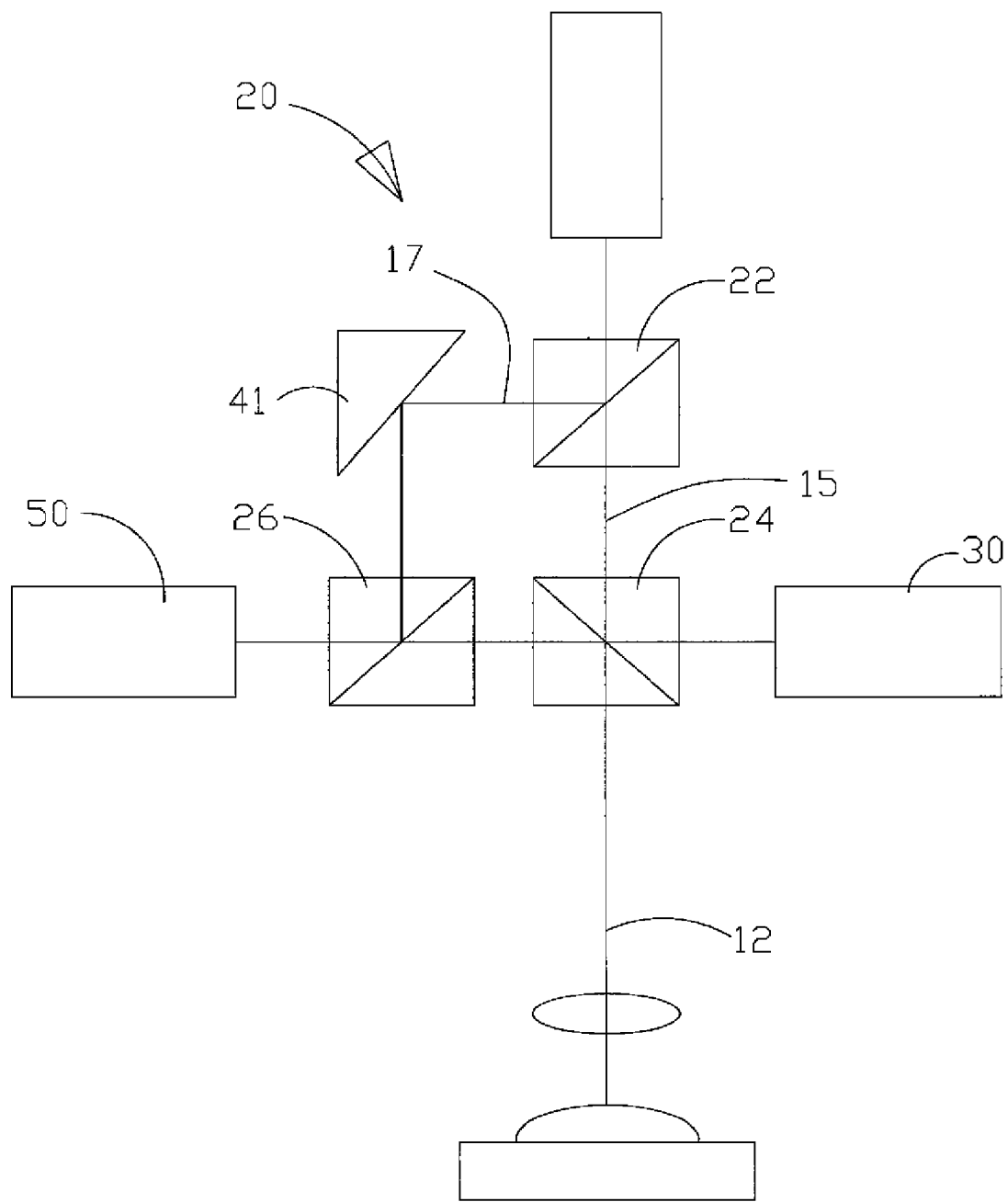
FIG. 6B shows a structural schematic diagram of an imaging and measuring apparatus for the surface and the internal interface of an object according to another preferred embodiment of the present invention.

FIGS. 6A and 6B show structural schematic diagrams of an imaging and measuring apparatus for the surface and the internal interface of an object according to another preferred embodiment of the present invention. As shown in FIG. 6A, the difference between the present embodiment and the one in FIG. 1 is that the wave-splitting structure 20 according to the present embodiment is different. In addition to the first, the second, and the third beamsplitters 22, 24, 26, the wave-splitting structure 20 according to the present embodiment further includes a reflecting component 41. The second beamsplitter 24 receives the light split by the first beamsplitter 22 and splits it into the first incident beam 12 and the calibration beam 17. The first incident beam 12 is transmitted to the object under test 2; the calibration beam 17 is transmitted to the reflecting component 41. The third beamsplitter 26 is disposed between the first beamsplitter 22 and the sensor 50. It receives the reference beam 15 firstly reflected by the wave-delaying device 30 and then passing through the first beamsplitter 22, and transmits the reference beam 15 to the sensor 50. The calibration beam 17 is firstly reflected by the reflecting component 41 and then is reflected by the third beamsplitter 26 to the sensor 50. The present embodiment can also be disposed as shown in FIG. 6B, wherein the locations of the first beamsplitter 22, the second beamsplitter 24, the third beamsplitter 26, and the reflecting component 41 can be changed without influencing the measuring result.

Figure 7A:
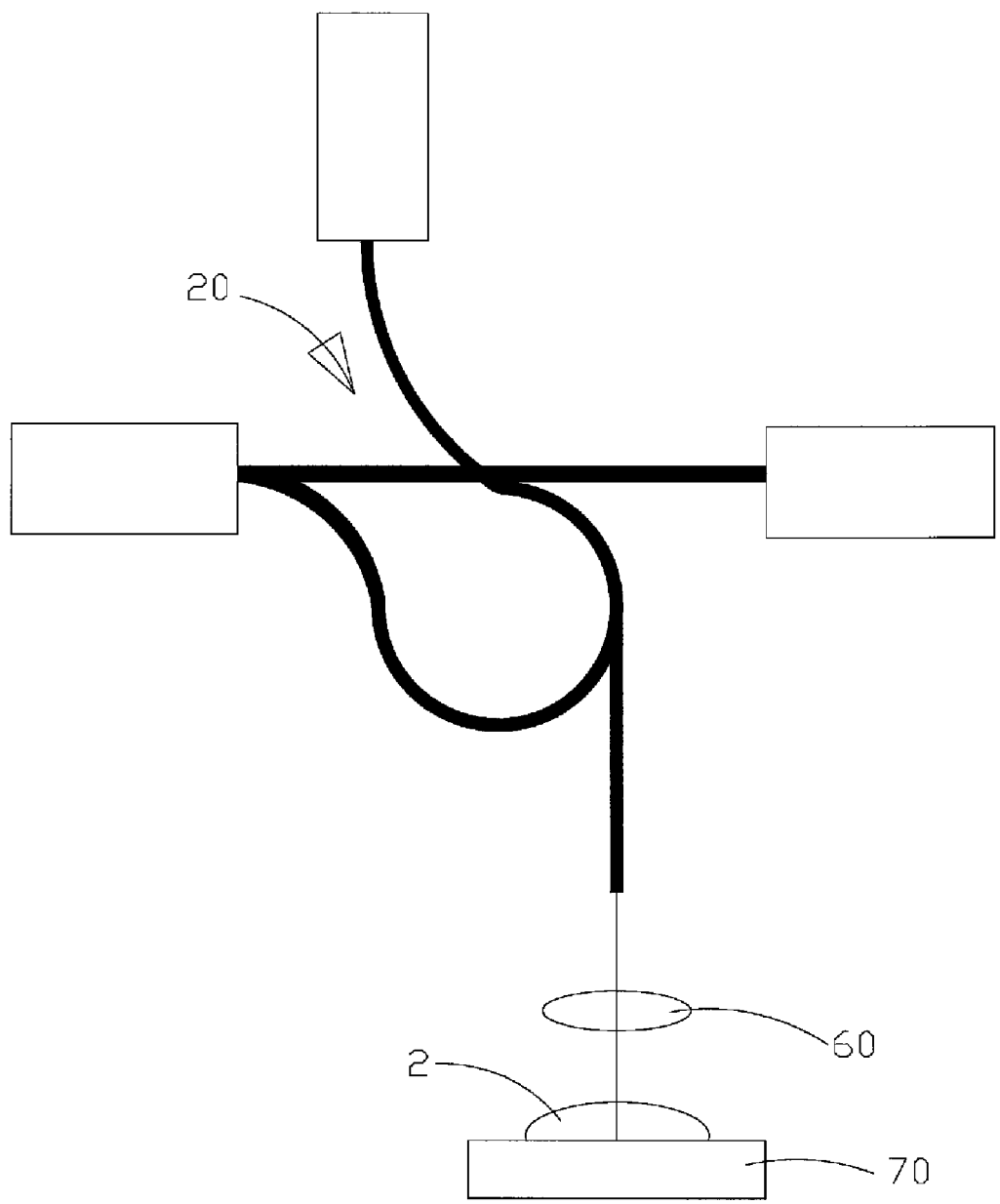
FIG. 7A shows a structural schematic diagram of an imaging and measuring apparatus for the surface and the internal interface of an object according to another preferred embodiment of the present invention.
Figure 7B:
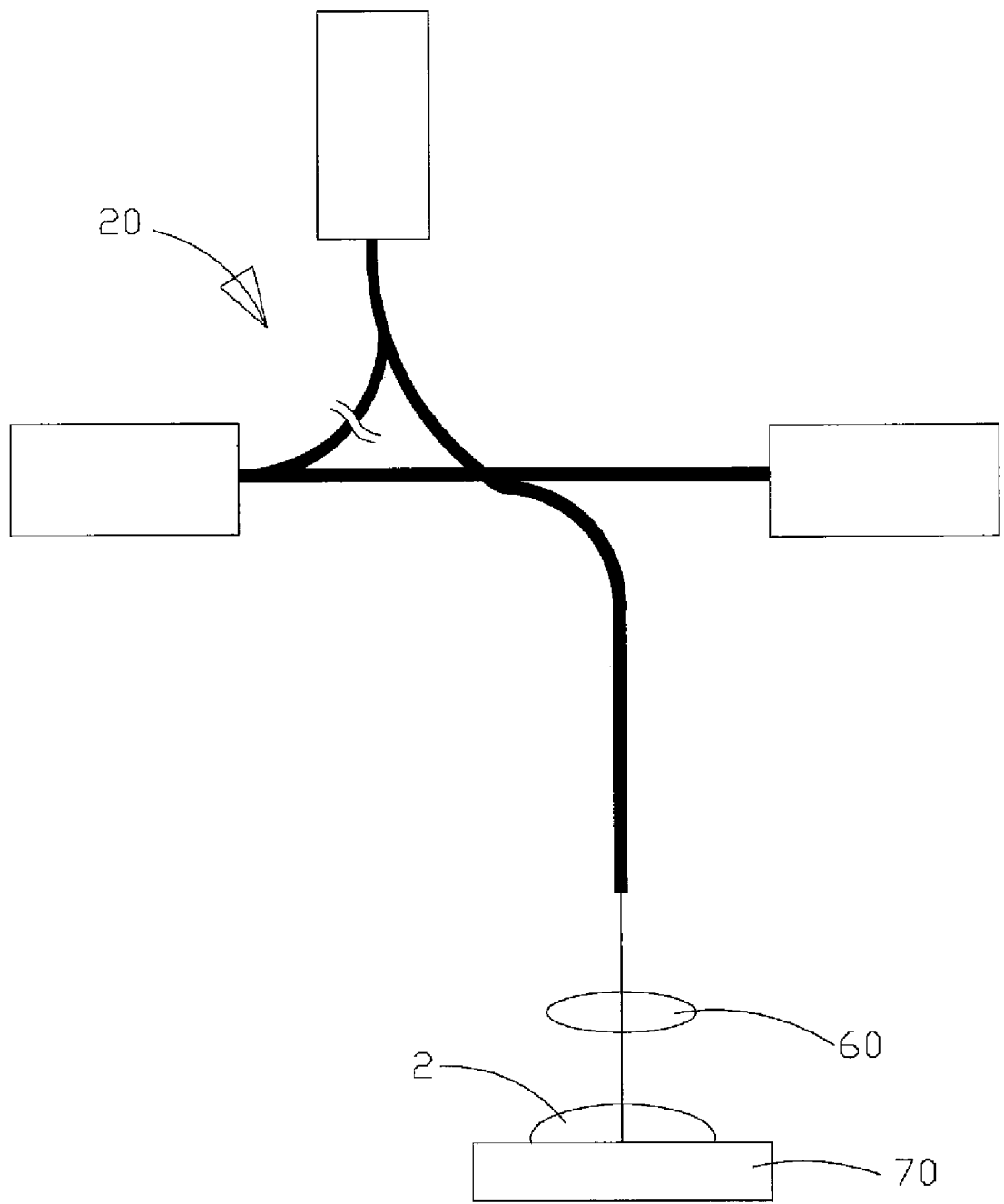
FIG. 7B shows a structural schematic diagram of an imaging and measuring apparatus for the surface and the internal interface of an object according to another preferred embodiment of the present invention.

FIG. 7A and FIG. 7B are embodiments similar to the embodiments in FIG. 6A and FIG. 6B, respectively. As shown in the figures, the difference between the present embodiments and the ones in FIGS. 6A and 6B is that the optical transmission structure and the wave-splitting structure 20 according to the present two embodiments are replaced by the corresponding optical-fiber components. Thereby, interferences coming from the external environment can be avoided and hence reducing noises and increasing measuring accuracy. In addition, other waveguiding devices, such as catheters and endoscopes, can also be used for broadening the applications of the present invention.

To sum up, the imaging and measuring apparatus for the surface and the internal interface of an object according to the present invention comprises a broadband wave source, a wave-splitting structure, a wave-delaying device, a reflecting component, and a sensor. The broadband wave source transmits a broadband incident wave. The wave-splitting structure splits the broadband incident wave into a first incident beam, a second incident beam, and a third incident beam. The first incident beam is illuminated on an object under test, which reflects a measuring beam. The wave-delaying device receives the second incident beam and reflects a reference beam. The reflecting component receives the third incident beam and reflects a calibration beam. The sensor receives a first interference signal of the measuring beam and the reference beam. The first interference signal is the signal representing the imaging of the internal interface of the object. The sensor also receives a second interference signal of the reference beam and the calibration beam. The second interference signal is used for compensating phase deviations. By means of the broadband incident wave, the morphologies of the surface and the internal interface of the object can be imaged and measured in a non-destructive way. In addition, by means of the calibration beam, the accuracy of imaging and measuring the surface and the internal interface of the object can be improved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An imaging and measuring apparatus for the surface and the internal interface of an object, comprising:
a broadband wave source, transmitting a broadband incident wave;
a wave-splitting structure, splitting said broadband incident wave into a first incident beam, a second incident beam, and a third incident beam, said first incident beam illuminating an object under test, and said object under test reflecting a measuring beam;
a wave-delaying device, receiving said second incident beam, and reflecting a reference beam;
a reflecting component, receiving said third incident beam, and reflecting a calibration beam;
a rotationally scanning device, said rotationally scanning device disposed between said wave-splitting structure and said object under test for receiving and scanning said first incident beam and receiving said measuring beam; and
a sensor, receiving a first interference signal of said measuring beam and said reference beam, said first interference signal being the imaging signal for the surface and the internal interface of an object, receiving a second interference signal of said reference beam and said calibration beam, and said second interference signal being used for compensating phase deviations.

2. The imaging and measuring apparatus for the surface and the internal interface of an object of claim 1, wherein said wave-splitting structure comprises:
a first wave-splitting device, splitting said second incident beam from said broadband incident wave, and said second incident beam being transmitted to said wave-delaying device; and
a second wave-splitting device, receiving and splitting the remaining beam of said broadband incident wave into said first incident beam and said third beam, said first incident beam being transmitted to said object under test, and said third incident beam being transmitted to said reflecting component.

3. The imaging and measuring apparatus for the surface and the internal interface of an object of claim 2, wherein said reflecting component is a reflection mirror.

4. The imaging and measuring apparatus for the surface and the internal interface of an object of claim 1, and further comprises a focusing device disposed between said object under test and said rotationally scanning device.

5. The imaging and measuring apparatus for the surface and the internal interface of an object of claim 1, and further comprises a translation device disposed under said object under test.

6. An imaging and measuring apparatus for the surface and the internal interface of an object, comprising:
a broadband wave source, transmitting a broadband incident wave;

a wave-splitting structure, splitting said broadband incident wave into a first incident beam, a second incident beam, and a third incident beam, said first incident beam illuminating an object under test, and said object under test reflecting a measuring beam;

a wave-delaying device, receiving said second incident beam, and reflecting a reference beam;

a reflecting means, receiving said third incident beam, and reflecting a calibration beam; and a first sensor, receiving a first interference signal of said measuring beam and said reference beam, and said first interference signal being the graphic signal for the surface and the internal interface of an object;

a second sensor, receiving a second interference signal of said reference beam and said calibration beam, and said second interference signal being the signal for compensating phase deviations; and a rotationally scanning device, said rotationally scanning device disposed between said wave-splitting structure and said object under test for receiving and scanning said first incident beam and receiving said measuring beam.

7. The imaging and measuring apparatus for the surface and the internal interface of an object of claim 6, wherein said wave-splitting structure comprises:

a first wave-splitting device, splitting said broadband incident wave;

a second wave-splitting device, receiving and splitting the remaining beam of said broadband incident wave into said first incident beam and said third beam, said first incident beam being transmitted to said object under test, and said third incident beam being transmitted to said reflecting component;

a third wave-splitting device, disposed between said first wave-splitting device and said wave-delaying device, receiving and splitting said second incident beam from the remaining beam of said broadband incident wave split by said first wave-splitting device, and transmitting said second incident beam to said wave-delaying device; and a fourth wave-splitting device, disposed between said third wave-splitting device and said second sensor, receiving said reference beam firstly reflected by said wave-delaying device and then reflected by said third wave-splitting device, receiving said reference beam and transmitting said reference beam to said second sensor, receiving said calibration beam split by said second wave-splitting and reflected by said reflecting component, and reflecting said calibration beam to said second sensor.

8. The imaging and measuring apparatus for the surface and the internal interface of an object of claim 7, wherein said reflecting means includes:

a first reflecting device, reflecting said third incident beam; and a second reflecting device, receiving said third incident beam reflected by said first reflecting device, reflecting said third incident beam back to said first reflecting device, and said first reflecting device receiving said third incident beam and reflecting said calibration beam.

9. The imaging and measuring apparatus for the surface and the internal interface of an object of claim 6, and further comprises a focusing device disposed between said object under test and said rotationally scanning device.

10. The imaging and measuring apparatus for the surface and the internal interface of an object of claim 6, and further comprises a translation device disposed under said object under test.

* * * * *